(12) United States Patent
Tan

(10) Patent No.: US 8,796,886 B2
(45) Date of Patent: Aug. 5, 2014

(54) AUTOMATICALLY TUNING A TRANSMITTER TO A RESONANCE FREQUENCY OF A RECEIVER

(75) Inventor: Li-Quan Tan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 117 days.

(21) Appl. No.: 13/452,726

(22) Filed: Apr. 20, 2012

(65) Prior Publication Data

US 2012/0311356 A1 Dec. 6, 2012

Related U.S. Application Data

(60) Provisional application No. 61/491,844, filed on May 31, 2011.

(51) Int. Cl.
*H01F 37/00* (2006.01)

(52) U.S. Cl.
USPC .......................................... 307/104

(58) Field of Classification Search
USPC .......................................... 307/104
See application file for complete search history.

(56) References Cited

U.S. PATENT DOCUMENTS

| | | | |
|---|---|---|---|
| 5,701,121 A | 12/1997 | Murdoch | |
| 6,028,413 A | 2/2000 | Brockmann | |
| 6,633,155 B1 | 10/2003 | Liang | |
| 6,844,702 B2 | 1/2005 | Giannopoulos et al. | |
| 6,970,142 B1 | 11/2005 | Pleva et al. | |
| 7,570,220 B2 | 8/2009 | Hall et al. | |
| 7,741,734 B2 | 6/2010 | Joannopoulos et al. | |
| 7,825,543 B2 | 11/2010 | Karalis et al. | |
| 8,198,754 B2 | 6/2012 | Iisaka et al. | |
| 8,332,547 B2 | 12/2012 | Sugaya | |
| 8,400,017 B2 | 3/2013 | Kurs et al. | |
| 8,463,332 B2 | 6/2013 | Sato et al. | |
| 8,598,747 B2 | 12/2013 | Bilbrey et al. | |
| 2003/0214821 A1 | 11/2003 | Giannopoulos et al. | |
| 2005/0134213 A1 | 6/2005 | Takagi et al. | |
| 2007/0298846 A1 | 12/2007 | Greene et al. | |
| 2008/0058029 A1 | 3/2008 | Sato et al. | |

(Continued)

FOREIGN PATENT DOCUMENTS

| | | |
|---|---|---|
| CN | 1829037 | 9/2006 |
| CN | 2919568 | 7/2007 |

(Continued)

OTHER PUBLICATIONS

International Search Report dated Jan. 2, 2012 for PCT/US2011/038635.

(Continued)

*Primary Examiner* — Hal Kaplan
(74) *Attorney, Agent, or Firm* — Womble Carlyle Sandridge & Rice LLP

(57) ABSTRACT

Various embodiments of a wirelessly powered local computing environment are described. The wireless powered local computing environment includes at least a near field magnetic resonance (NFMR) power supply arranged to wirelessly provide power to any of a number of suitably configured devices. In the described embodiments, the devices arranged to receive power wirelessly from the NFMR power supply must be located in a region known as the near field that extends no further than a distance of a few times a characteristic size of the NFMR power supply transmission device. Typically, the distance can be on the order of 1 meter or so. The NFMR power supply is used to tune a transmitter in order to maintain a high Q factor.

28 Claims, 10 Drawing Sheets

(56) References Cited

U.S. PATENT DOCUMENTS

| | | |
|---|---|---|
| 2008/0079396 A1 | 4/2008 | Yamazaki et al. |
| 2009/0058189 A1 | 3/2009 | Cook et al. |
| 2009/0058361 A1 | 3/2009 | John |
| 2009/0133942 A1 | 5/2009 | Iisaka et al. |
| 2009/0134712 A1 | 5/2009 | Cook et al. |
| 2009/0243394 A1 | 10/2009 | Levine |
| 2009/0243397 A1 | 10/2009 | Cook et al. |
| 2009/0251008 A1 | 10/2009 | Sugaya |
| 2009/0271048 A1 | 10/2009 | Wakamatsu |
| 2009/0284220 A1 | 11/2009 | Toncich et al. |
| 2009/0286470 A1 | 11/2009 | Mohammadian et al. |
| 2009/0289595 A1 | 11/2009 | Chen et al. |
| 2010/0007307 A1 | 1/2010 | Baarman et al. |
| 2010/0036773 A1 | 2/2010 | Bennett |
| 2010/0052431 A1 | 3/2010 | Mita |
| 2010/0148723 A1 | 6/2010 | Cook et al. |
| 2010/0171368 A1 | 7/2010 | Schatz et al. |
| 2010/0181961 A1 | 7/2010 | Novak et al. |
| 2010/0184371 A1 | 7/2010 | Cook et al. |
| 2010/0187913 A1 | 7/2010 | Smith et al. |
| 2010/0194334 A1 | 8/2010 | Kirby et al. |
| 2010/0222010 A1 | 9/2010 | Ozaki et al. |
| 2010/0244583 A1 | 9/2010 | Shimokawa |
| 2010/0279606 A1 | 11/2010 | Hillan et al. |
| 2010/0323616 A1 | 12/2010 | Von Novak et al. |
| 2011/0018679 A1 | 1/2011 | Davis et al. |
| 2012/0153732 A1 | 6/2012 | Kurs et al. |
| 2012/0169136 A1 | 7/2012 | Lisi et al. |
| 2012/0187767 A1 | 7/2012 | Kanno et al. |
| 2012/0206097 A1 | 8/2012 | Soar |
| 2012/0217818 A1 | 8/2012 | Yerazunis et al. |
| 2012/0262002 A1 | 10/2012 | Widmer et al. |

FOREIGN PATENT DOCUMENTS

| | | |
|---|---|---|
| EP | 0786835 | 7/1997 |
| EP | 0903830 | 3/1999 |
| EP | 2075667 | 7/2009 |
| EP | 2033312 | 2/2011 |
| JP | 2005151609 | 6/2005 |
| JP | 2005210843 | 8/2005 |
| JP | 2006314181 | 11/2006 |
| JP | 2009131039 | 6/2009 |
| JP | 2009251895 | 10/2009 |
| JP | 2009268311 | 11/2009 |
| WO | WO2007089680 | 8/2007 |
| WO | WO2007146164 | 12/2007 |
| WO | WO 2008/109489 | 9/2008 |
| WO | WO2009039113 | 3/2009 |
| WO | WO2009039115 | 3/2009 |
| WO | WO2009111597 | 9/2009 |
| WO | WO2009122355 | 10/2009 |
| WO | WO2009131990 | 10/2009 |
| WO | WO2010047850 | 4/2010 |
| WO | WO2010093967 | 8/2010 |
| WO | WO2010129369 | 11/2010 |
| WO | WO 2011/028956 | 3/2011 |

OTHER PUBLICATIONS

Written Opinion dated Jan. 2, 2012 for PCT/US2011/038635.
PCT Application No. PCT/US2011/038635—International Search Report dated Jan. 2, 2012.
PCT Application No. PCT/US2011/038635—Written Opinion dated Jan. 2, 2012.
Korean Patent Application No. 10-2013-7032979—Notice of Preliminary Rejection dated Feb. 21, 2014.
Taiwanese Patent Application No. 099139193—Office Action dated Feb. 12, 2014.
Japanese Patent Application No. 2012-538950—Office Action dated Aug. 12, 2013, 8 pages.
Taiwanese Patent Application No. 099139193—Office Action dated Aug. 26, 2013, 16 pages.
Korean Patent Application No. 10-2012-7015364—Office Action dated Sep. 11, 2013, 10 pages.
PCT Application No. PCT/US2010/056240—International Search Report dated May 24, 2011.
PCT Application No. PCT/US2010/056240—Written Opinion dated May 24, 2011.
PCT Application No. PCT/US2011/038640—International Search Report dated Jan. 2, 2012.
PCT Application No. PCT/US2011/038640—Written Opinion dated Jan. 2, 2012.
Karalis, A. et al., "Efficient wireless non-radiative mid-range energy transfer," Annals of Physics, 323, (2008) pp. 34-48.
PCT Application No. PCT/US2011/061384—International Search Report dated Feb. 14, 2013.
PCT Application No. PCT/US2011/061384—Written Opinion dated Feb. 14, 2013.
Disclosed Anonymously, "Wireless Conductive AC/DC Power for Laptops and Other Devices", IP.com No. IPCOM000197537D, published Jul. 13, 2010 (5 pages).
PCT Application No. PCT/US2011/038641—International Search Report & Written Opinion dated Jan. 2, 2012.
PCT Application No. PCT/US2011/038633—International Search Report & Written Opinion dated Jan. 2, 2012.
Yuan, Q. et al. "Numerical Analysis on Transmission Efficiency of Evanescent Resonant Coupling Wireless Power Transfer System", IEEE Transactions on Antennas and Propagation, vol. 58, No. 5, May 2010, pp. 1751-1758.
Cannon, B.L. et al. "Magnetic Resonant Coupling As a Potential Means for Wireless Power Transfer to Multiple Small Receivers", IEEE Transactions on Power Electronics, vol. 24, No. 7, Jul. 2009, pp. 1819-1825.
IBM, "Method for Prioritizing Distribution of Wireless Electricity to Multiple Users Using a Single Power Source", IP.com No. IPCOM000188525D, published Oct. 12, 2009, pp. 1-2.
Chinese Application for Invention No. 201110462933.9—Office Action dated Dec. 20, 2013.
Chinese Application for Invention No. 201080051931.4 —Office Action dated Jan. 23, 2014.

AUTOMATICALLY TUNING A TRANSMITTER TO A RESONANCE FREQUENCY OF A RECEIVER

CROSS REFERENCE TO RELATED APPLICATIONS

This application claims priority to and the benefit under 35 U.S.C. §119(e) of U.S. Provisional Application Ser. No. 61/491,844, filed May 31, 2011, entitled MAGNETICALLY DE-COUPLED MULTIPLE RESONATING COILS IN A TIGHTLY SPACED ARRAY, the entire disclosure of which is incorporated herein by reference.

TECHNICAL FIELD

The described embodiments relate generally to utilizing a wireless power transmission in a portable computing environment.

BACKGROUND

As described in Annals of Physics 323 (2008) 34-48 "Efficient Wireless non-radiative mid-range energy transfer" by Aristeidis Karalis et al., available online Apr. 27, 2007, that is incorporated by reference in its entirety for all purposes, useable power can be transferred wirelessly from a power source to a receiver located within a distance referred to as a near field.

Therefore, what is desired are methods, systems, and apparatus for maintaining a maximum power transfer between a wireless power transmitter and a wireless receiver in a wirelessly powered local computing environment.

SUMMARY

The present invention provides a system and method for utilizing wireless near field magnetic resonance (NFMR) power transmission in a computing environment. In particular, techniques for maintaining a shared resonance frequency in the transmitter and receiver in a magnetic resonance power transfer system are described.

In one embodiment, a wireless power transmission unit is described. The wireless power transmission unit includes at least a varying frequency excitation source arranged to provide a variable circuit excitation at frequency f and a first resonator structure coupled to the varying frequency f excitation source, the first resonator structure having a resonant frequency $\omega_1$, a first Q factor $Q_1$, and a characteristic size $L_1$. Non-radiative energy transfer between the first resonator structure and a second resonator structure positioned apart from the wireless power transmission unit, the second resonator structure having a resonant frequency $\omega_2$, a second Q factor $Q_2$, and a characteristic size $L_2$ is mediated through a magnetic resonant coupling associated with evanescent tails between the first resonator structure and the second resonator structure when the first resonator structure and the second resonator structure are in a tuned state. The first and second resonator structures are in the tuned state when the first resonant frequency $\omega_1$ and the second resonant frequency $\omega_2$ are within the narrower of first resonance width $\Gamma_1$ or second resonance width $\Gamma_2$ such that the first resonant frequency $\omega_1$ and the resonant frequency $\omega_2$ are separated by a bandwidth of no more than 3 db. The first resonator structure maintains the first resonator structure and the second resonator structure in the tuned state by varying the first resonant frequency $\omega_1$ in order to maintain the first resonant frequency $\omega_1$ and the second resonant frequency $\omega_2$ such that the first resonant frequency $\omega_1$ and the resonant frequency $\omega_2$ are separated by the bandwidth of no more than 3 db in accordance with any changes in the second resonant frequency $\omega_2$.

In still another embodiment, a wirelessly powered local computing environment is described that includes at least a variable frequency power supply arranged to provide power at a frequency, a resonance frequency-adjustable near field magnetic resonance (NFMR) wireless transmitter coupled to the power supply and arranged to create a resonance channel used to transfer useable energy from the power supply to a receiver within a near field distance d, and a central processing unit, the central processing unit providing processing resources to the variable frequency power supply and the resonance frequency-adjustable NFMR transmitter. In the described embodiment, when the NFMR transmitter establishes a resonance coupling with the receiver, the central processing unit maintains the resonance frequency by adjusting the NFMR transmitter.

In another embodiment, a method performed by a wireless power transmission unit for automatically tuning a wireless power transmission system is described. In the described embodiment, the wireless power transmission unit includes at least a first resonator structure coupled to a varying frequency f voltage supply. The method can be performed by establishing a magnetic resonant inductive coupling between the first resonator structure to a second resonator structure positioned apart from the wireless power transmission unit in a tuned state, non-radiatively transferring useable power from the first resonator structure to the second resonator structure using the magnetic resonant inductive coupling between the first resonator structure and the second resonator structure. In the tuned state, a first resonant frequency $\omega_1$ of the first resonator structure and the second resonant frequency $\omega_2$ of the second resonator structure are separated by a bandwidth of no more than 3 db. The first resonator structure maintains the first resonator structure and the second resonator structure in the tuned state by varying a first resonant frequency $\omega_1$ of the first resonant structure in order to maintain the first resonant frequency $\omega_1$ and a second resonant frequency $\omega_2$ are separated by the bandwidth of no more than 3 db in accordance with any change in the second resonant frequency $\omega_2$.

Other apparatuses, methods, features and advantages of the described embodiments will be or will become apparent to one with skill in the art upon examination of the following figures and detailed description. It is target that all such additional apparatuses, methods, features and advantages be included within this description be within the scope of and protected by the accompanying claims.

BRIEF DESCRIPTION OF THE DRAWINGS

The included drawings are for illustrative purposes and serve only to provide examples of possible structures and arrangements for the disclosed embodiments. These drawings in no way limit any changes in form and detail that may be made to the described embodiments by one skilled in the art without departing from the spirit and scope of the embodiments.

DETAILED DESCRIPTION

Figure 1:
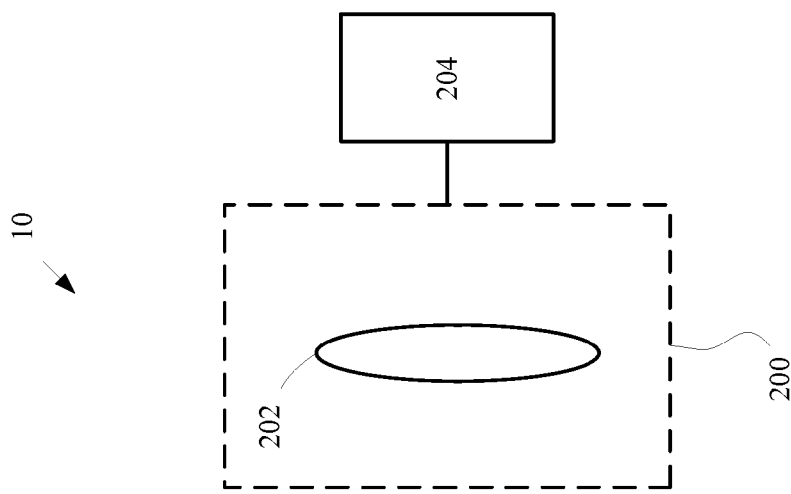
FIG. 1 shows an exemplary system diagram of an auto-tuning wireless power transfer system in accordance with the described embodiments.
Figure 1:
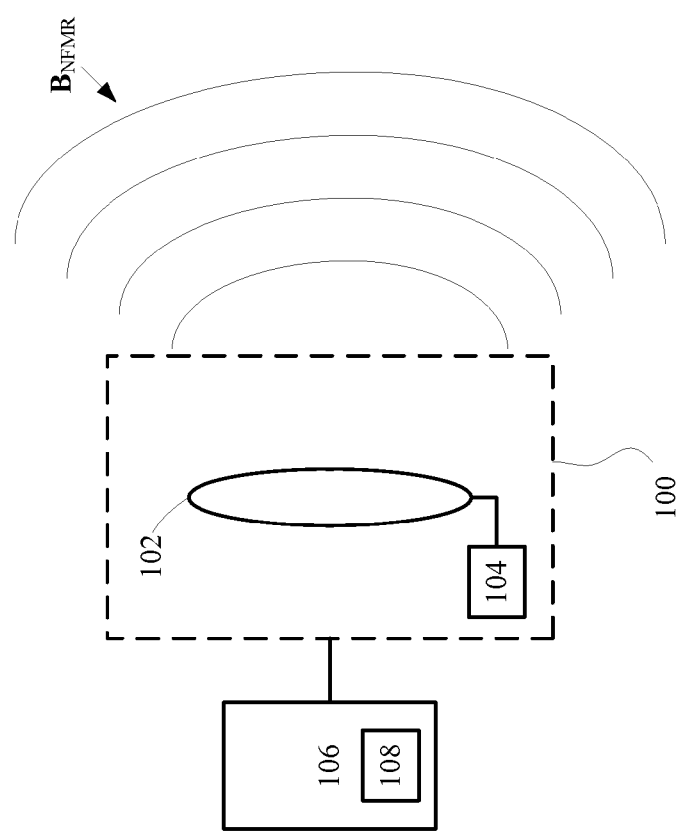

Various embodiments of a wirelessly powered local computing environment are described. The wireless powered local computing environment includes at least a near field magnetic resonance (NFMR) power supply arranged to wirelessly provide power to any of a number of suitably configured devices. In the described embodiments, the devices arranged to receive power wirelessly from the NFMR power supply can be located in a region known as the near field that extends about a distance D that can be a few times a characteristic size of the NFMR power supply transmission device. Typically, the distance D can be on the order of 1 meter or so. The local wireless environment can be affected by many things such as the relative positions of the NFMR power transmitter and receivers, obstacles that can affect the distribution of magnetic energy in the NFMR field that can adversely affect the resonance frequency of the system as a whole and those of the NFMR power transmitter and receiver specifically. This effective de-tuning of resonance frequency can effectively reduce the overall efficiency of the system (i.e., the $Q_{system}$ factor) which can result in a concomitant reduction in the amount of useable power that can ultimately be transferred.

In the context of this discussion, it is well known that useable power can be wirelessly transmitted by way of a wireless transmitter and receiver transiently coupled by way of a magnetic field. More specifically, a system in accordance with the described embodiments can include a wireless power receiver incorporated within or electrically coupled to a peripheral device that can wirelessly receive useful amounts of power from an external power supply. In the described system, the wireless power receiver can include a first resonator structure having a first resonant frequency $\omega_1$, a first Q factor $Q_1$ (a measure of power transfer efficiency), and a first characteristic size $L_1$. For example, in the context of a computing system where the peripheral device takes the form of a computer mouse or other input device, the characteristic size $L_1$ can be on the order of a few inches or centimeters. The system can also include a power supply coupled to at least a second resonator structure positioned a variable distance d from the first resonator structure having a second resonant frequency $\omega_2$ and a second Q factor $Q_2$ and second characteristic size $L_2$. For example, the second resonator structure can be incorporated within a computer such as a desktop or laptop computer. In this way, a charging region can be formed around the computer in which the peripheral device (or any other appropriately configured device) can wirelessly receive useful amounts of power from the power supply via the second resonator structure.

When first and second resonant frequencies $\omega_1$ and $\omega_2$ are close together, a coupling region between the first and second resonator structures can be formed. Within this coupling region, useful power can be transferred by way of a non-radiative energy transfer mechanism that utilizes resonant-field evanescent tails of the magnetic field provided by the second resonator structure. For example, when the first resonator structure is incorporated into a peripheral device such as a computer mouse, the computer mouse can be at least partially supplied with power from the second resonator structure coupled to the power supply mediated by the magnetic field. In this way, the peripheral device can operate in a wireless mode without the need for a power supply other than that provided in the computing device. The amount and duration of power that can be delivered to the peripheral device can be dependent on a number of factors. For example, the coupling between the first resonator structure and the second resonator structure can be highly dependent upon maintaining a tuned state between the first and second resonant structures.

In a magnetic resonance power transfer system, at least a transmitter and a receiver are resonantly coupled in such a way that useable power can be transferred from a power supply by way of the transmitter to at least one receiver. In order to transfer useable power, both the transmitter and receiver are tuned to a resonance frequency characteristic of the magnetic resonance power transfer system. A quality factor or Q factor is a dimensionless parameter that can be used as a measure of the ability of the resonant system to transfer energy from the transmitter to the receiver. More specifically, the Q factor is the ratio of power stored to power dissipated in reactance and resistance elements in the circuit according to Eq. (1):

$$\frac{Pstored}{Pdissipated} = \frac{I^2 X}{I^2 R} \qquad \text{Eq. (1)}$$

where X is the capacitive/inductive reactance, and
R is series resistance.

The Q factor can also be used to characterize a resonator's bandwidth (BW) relative to its center frequency in accordance with Eq. (2):

$$BW = \Delta\omega = \omega_h - \omega_1 = \omega_c/Q \qquad \text{Eq. (2)}$$

where $\omega_h$=high band edge, $\omega_1$=low band edge, and $\omega_c$=center frequency (resonant frequency)

$$\omega_1 = \omega_c - \Delta\omega/2$$

$$\omega_h = \omega_c + \Delta\omega/2.$$

Therefore, systems having high Q factors have necessarily narrow bandwidths (i.e., $\Delta\omega/2$ decreases as Q increases). For example, a wireless power transfer system with a system quality factor $Q_{system}$ of 100 or more can be achieved by properly tuning the transmitter and receiver. However, the higher the Q factor, the narrower the associated frequency range. For example, a wireless power transfer system can only maintain system quality factor $Q_{system}$ of at least 100 by tuning the resonant frequencies of the transmitter and receiver to within an extremely tight (such as 3 dB) bandwidth of each other. In other words, the transmitter and receiver must be very closely tuned to the same frequency for significant power transfer to occur. If the transmitter and receiver become de-tuned beyond the 3 dB bandwidth, the ability of the wireless power transfer system to magnetically transfer power exponentially decays. The detuning of the system can occur if either a) the transmitter or receiver detunes (i.e not resonating) or b) the resonance frequency of the transmitter and receiver do not align resulting from interference created by extraneous objects (typically ferro-magnetic) that capacitively couple with either or both the transmitter or receiver.

For example, if either the transmitter and/or receiver are placed in an environment in which the transmitter and/or receiver are in proximity to metallic or ferromagnetic objects, the resonance frequency of either can deviate significantly from design due to magnetic or capacitive coupling to the objects in the environment. Therefore, without any modifications, the transmitter and receiver can de-tune to such a degree that the system Q factor drops precipitously resulting in a substantial, if not complete, loss in power transfer between the transmitter and receiver.

Accordingly, the following discussion describes techniques for automatically maintaining a NFMR power transfer system in a tuned state thereby maintaining a high system Q factor. In one embodiment, the system can be maintained in a tuned state by automatically tuning a transmitter to match the resonant frequency of an associated receiver. The high system Q factor, in turn, facilitates an efficient transfer of power from the transmitter to the receiver having the effect of providing useful amounts of power wirelessly to a device coupled to the receiver. In one embodiment, the transmitter is actively tuned in order to maintain resonance coupling between the transmitter and receiver. Tuning the transmitter is an advantageous technique since the transmitter is typically tethered to a power source that can be frequency adjusted.

In one embodiment, the transmitter can be coupled to an oscillator circuit that can generate a frequency used to excite the transmitter. The oscillator circuit can take the form of a variable oscillator circuit that can be adjusted via a variable clock circuit or a VCO (voltage controlled oscillator). Moreover, a capacitance or inductance of the resonant system can be modified in such a way that the resonance frequency of the transmitter is within an acceptable range of the resonance frequency of the system. In this way, maximum power can be transferred from the power supply via the transmitter to the receiver that can be used to provide power to a device. In one embodiment, a variable capacitance circuit can be used to change the system capacitance, leaving the system inductance unchanged. Other techniques can be used in other embodiments.

In yet another embodiment, non-transitory computer readable medium for storing a computer program executable by a processor in a wireless power transmission unit for automatically tuning a wireless power transmission system is described. In the described embodiment, the wireless power transmission unit includes at least a first resonator structure coupled to a varying frequency f voltage supply. The computer readable medium includes at least computer code for establishing a magnetic resonant inductive coupling between the first resonator structure to a second resonator structure positioned apart from the wireless power transmission unit in a tuned state, computer code for non-radiatively transferring useable power from the first resonator structure to the second resonator structure using the magnetic resonant inductive coupling between the first resonator structure and the second resonator structure, wherein in the tuned state, a first resonant frequency $\omega_1$ of the first resonator structure and the second resonant frequency $\omega_2$ of the second resonator structure are separated by a bandwidth of no more than 3 db; and computer code for maintaining the first resonator structure and the second resonator structure in the tuned state by first resonator structure by varying a first resonant frequency $\omega_1$ of the first resonator structure in order to maintain the first resonant frequency $\omega_1$ and a second resonant frequency $\omega_2$ are separated by the bandwidth of no more than 3 db in accordance with any change in the second resonant frequency $\omega_2$.

In another embodiment, a method performed by a processor for auto-tuning the resonance frequency of a near field magnetic resonance (NFMR) transmitter to its receiver is described. In the described embodiment, the NFMR transmitter is arranged to create a resonance channel used to transfer useable energy from a variable frequency power supply to a receiver within a near field distance d of the transmitter, the variable frequency power supply is arranged to provide the power to the NFMR transmitter at a frequency. The method is carried out by performing at least the following operations: providing power to the NFMR transmitter at a frequency by the variable frequency power supply, adjusting the NFMR transmitter to resonate at the power supply frequency, monitoring peak real power supplied to the resonating NFMR transmitter by the power supply, and setting the frequency of the variable frequency power supply to the current frequency when the monitored peak real power supplied is less than peak real power supplied at other frequency when the NFMR is also resonating by at least a pre-determined amount.

In yet another embodiment, a non-transitory computer readable medium for storing computer code executed by a processor for auto-tuning a near field magnetic resonance (NFMR) transmitter is described. In the described embodiment, the NFMR transmitter is arranged to create a resonance channel used to transfer useable energy from a variable frequency power supply to a receiver within a near field distance d of the transmitter, the variable frequency power supply is arranged to provide the power to the NFMR transmitter at a frequency. The computer readable medium includes at least computer code for providing power to the NFMR transmitter at the frequency by the variable frequency power supply, computer code for maintaining the NFMR transmitter in resonance mode, computer code for changing the frequency of the variable frequency power supply to a current frequency, computer code for monitoring a current generated in response to the provided power at the current frequency, and computer code for setting the frequency of the variable frequency power supply to the current frequency when the monitored current is less than an average current by at least a pre-determined amount.

These and other embodiments are discussed below with reference to FIGS. 1-9. However, those skilled in the art will readily appreciate that the detailed description given herein with respect to these figures is for explanatory purposes only and should not be construed as limiting.

FIG. 1 shows an exemplary system diagram of an auto-tuning wireless power transfer system in accordance with the described embodiments. Magnetic resonance power transfer system 10 can include transmitter 100 configured to supply power wirelessly to receiver 200 by way of magnetic field $B_{NFMR}$. Transmitter 100 can include at least transmitter resonator or resonator configured as coil 102 (Tx Coil). Similarly, receiver 200 can be configured as having a receiver resonator or resonator as coil 202 (Rx Coil). In some aspects, transmitter coil 102 (Tx Coil) and/or the receiver coil 202 (Rx Coil) can be presumed to be essentially a two-dimensional structure. In the described embodiment, Tx coil 102 can be coupled to transmitter impedance-matching circuit 104 that can be used to match the impedances between Tx coil 102 and Rx coil 202. In the described embodiment, Rx coil 202 can be coupled to receiver load device 204 that receives useful amounts of power from power supply 106 connected to transmitter 100. Transmitter 100 can wirelessly transfer power received from power supply 106 using Tx Coil 102 resonantly coupled with Rx Coil 202. Power received at Rx Coil 202 can be passed to load device 204. In the described embodiment, tuning circuit 108 can be used to automatically adjust characteristics of transmitter 100 in order that a system quality factor remains greater than a pre-determined threshold value. In one embodiment, tuning circuit 108 can detect the presence of a resonating receiver unit and adjust the resonance frequency of transmitter 100 accordingly.

Figure 2A:
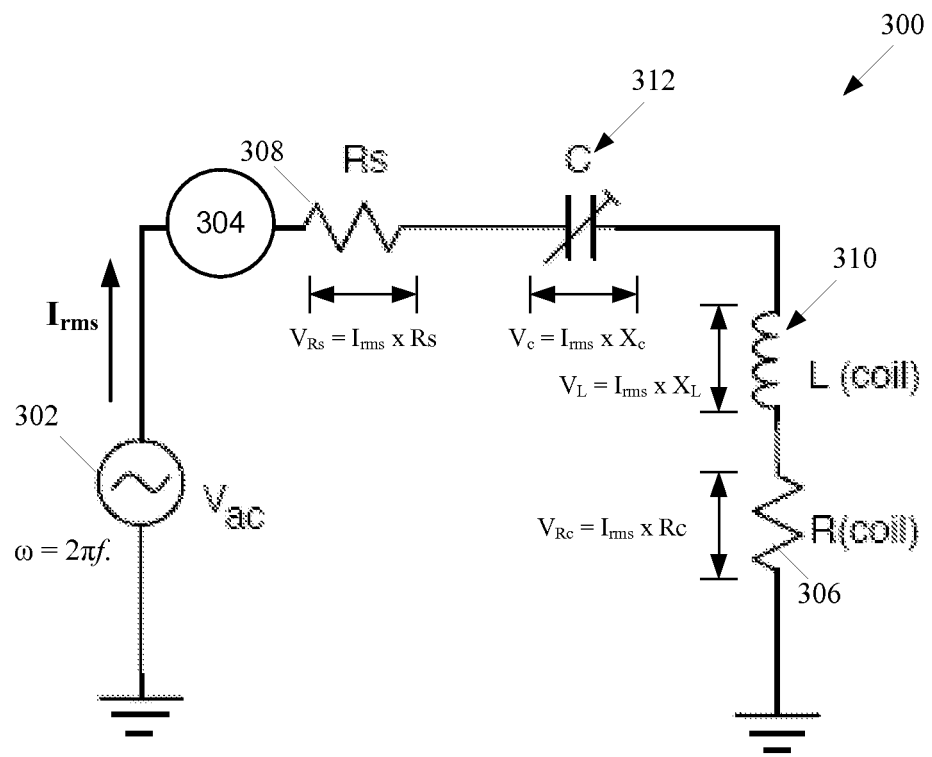
FIGS. 2A-2B shows embodiments of an RLC equivalent circuit of a transmitter having adjustable capacitive and inductive elements, respectively.
Figure 2B:
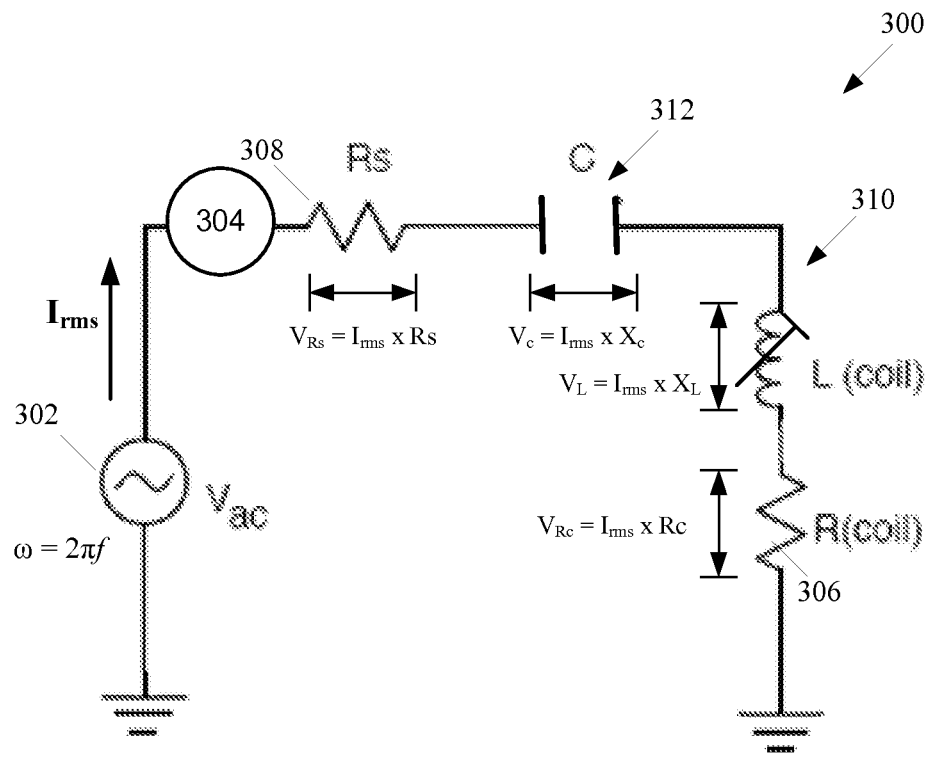

FIGS. 2A-2B shows embodiments of an RLC equivalent circuit of a transmitter having adjustable capacitive and inductive elements, respectively. For example, as shown in FIG. 2A and FIG. 2B, RLC circuit 300 can include various reactive elements such as capacitors and inductors. RLC circuit 300 can also include various resistive elements representing various aspects of transmitter 100. For example, various parasitic power losses inherent in transmitter 100 can be characterized as a series resistor. It should be further noted that the overall impedance Z of RLC circuit 300 can be a combination of resistance values of the various resistive elements as well as reactive values of constituent inductors and capacitors. It should be noted, however, that the electrical characteristics of inductors and capacitors and therefore their respective reactance values are frequency dependent. At a resonance frequency, the inductance and capacitance reactive values are equal in magnitude but 180° out of phase having the effect that the reactive values of the inductors and capacitors cancel each other out resulting a sharp drop in overall circuit impedance Z. This sharp drop in overall circuit impedance Z can be used to automatically and periodically detect a resonant frequency of RLC circuit 300 in a manner described below in more detail.

More particularly, as shown in FIG. 2A, RLC circuit 300 can include voltage source ($V_s$) 302 in the form of a variable excitation source along the lines of an AC power supply arranged to provide variable voltage $V_{AC}$. It should be noted that in terms of this discussion, alternating voltage $V_{AC}$ need not be sinusoidal in nature in which case alternating voltage $V_{AC}$ can have fundamental frequency f Hz represented as $\omega = 2\pi f$. In the described embodiment, $V_s$ 302 can be connected in series with power detector 304. Power detector 304 can be used to detect current $I_{rms}$ as well as real power developed in circuit 300 in response to the application of alternating voltage $V_{AC}$ and calculate the real power supplied by the power source 302. Those skilled in the art will realize that 302 can also be also an alternating current source instead of alternating voltage source with similar end goal of supply power to circuit 300 with variable frequency.

RLC circuit 300 can also include coil resistor $R_{coil}$ 306 that can represent the resistance or power loss inherent in Tx Coil 102. Series resistor $R_s$ 308 can represent the resistance or power loss in the remainder of circuit 300 associated with, for example, PCB traces, internal resistance of $V_s$ 302 and so on. Coil inductance can be represented as coil inductor 310, or more simply $L_{coil}$ 310 having reactance $X_L (=\omega L_{coil})$ and variable capacitor (or capacitor bank) C 312 having reactance $X_C (=1/\omega C_{coil})$ that can be varied, or tuned, such that circuit 300 resonates at which point $X_L = X_C$ resulting in a sharp drop in circuit impedance Z as shown by Eq. (3a) and Eq. (3b) and Eq. (3c):

$$I_{rms} = V_{rms}/Z \quad \text{Eq. (3a)}$$

where $$Z = \sqrt{(R^2) + (X_L - X_C)^2} \quad \text{Eq. (3b)}$$

$$Z = R_{circuit} = R_S + R_{coil} \quad \text{Eq. (3c)}$$

Figure 3:
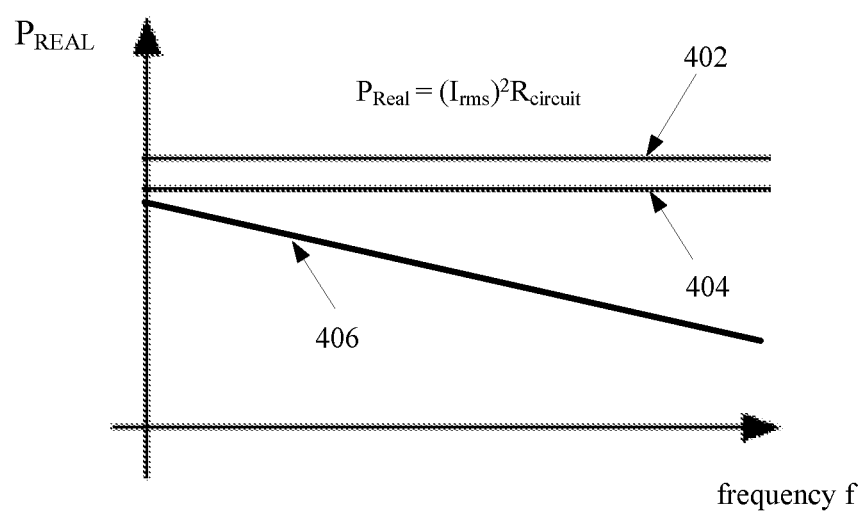
FIG. 3 shows representative $P_{real}$ family of curves for a transmitter in accordance with the described embodiments.

Therefore at resonance (i.e., $X_L = X_c$), circuit impedance Z simply reduces to $Z = R_{circuit}$. In this way by incrementing frequency f of Vs 302 and tuning capacitor C 312 to maintain RLC circuit 300 in resonance, power detector 304 will measure real power as approximately a straight line vs resonance frequency of circuit 300 as illustrated in FIG. 3 as line 402 (presuming little or no frequency dependence of the resistive elements) and according to Eq. (4) showing the relationship between $P_{Real}$, $I_{RMS}$ and $V_{RMS}$ that can be used to characterize transmitter 100 in resonance:

$$P_{Real} = (I_{rms})^2 R_{circuit} = (V_{rms})^2 / R_{circuit} \quad \text{Eq. (4)}.$$

In place of or in addition to variable capacitor C 312, RLC circuit 300 can include variable inductor L 312 as shown in FIG. 2B.

Figure 4:
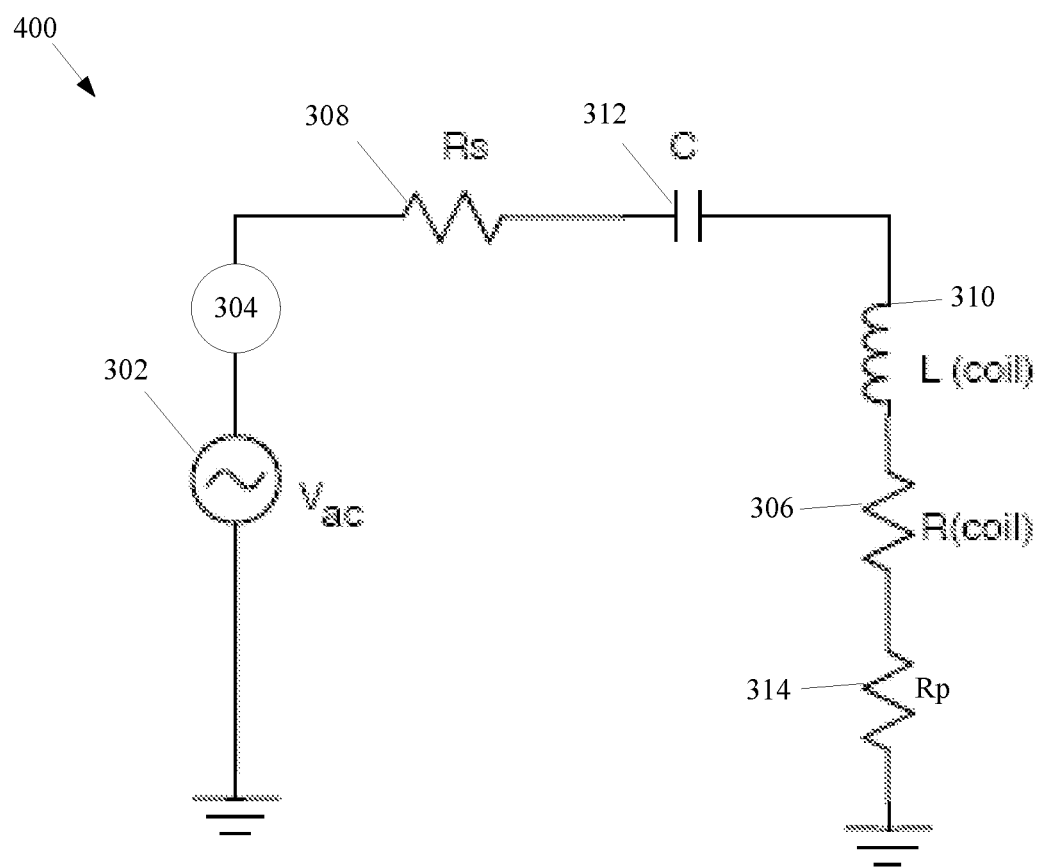
FIG. 4 represents an RLC equivalent circuit of a transmitter with parasitic resistance in accordance with the described embodiments.

It should be noted that parasitic lossy elements along the lines of metallic or magnetic objects in the vicinity of Tx Coil 102 can be represented as an additional resistive element along the lines of $R_p$ 314 shown in FIG. 4 as circuit 400. The addition of parasitic resistance $R_p$ increases circuit resistance $R_{circuit}$ resulting in a reduction in $P_{Real}$ as shown in FIG. 3 as curve 404. In this way, transmitter 100 can be characterized by a family of $P_{Real}$ curves. In some cases, the $P_{Real}$ curves can be frequency independent such as shown in FIG. 3 as curve 402, 404 or frequency dependent shown in FIG. 3 as curve 406. In the frequency dependent scenario, some of the resistive elements can be sensitive to frequency f in that their respective resistive values can change as frequency f changes as a result of, for example, changing frequency f during a frequency sweep operation. For example, in the scenario represented by FIG. 3 with regards to curve 406, at least some of the resistive elements can be exhibit higher resistance values when frequency f is high as opposed to low resulting in curve 406 having a non-zero slope (in the example, shown the linearity of curve 406 is maintained by presuming that all resistive elements are equally sensitive to frequency, which may not be true in all cases).

Figure 5:
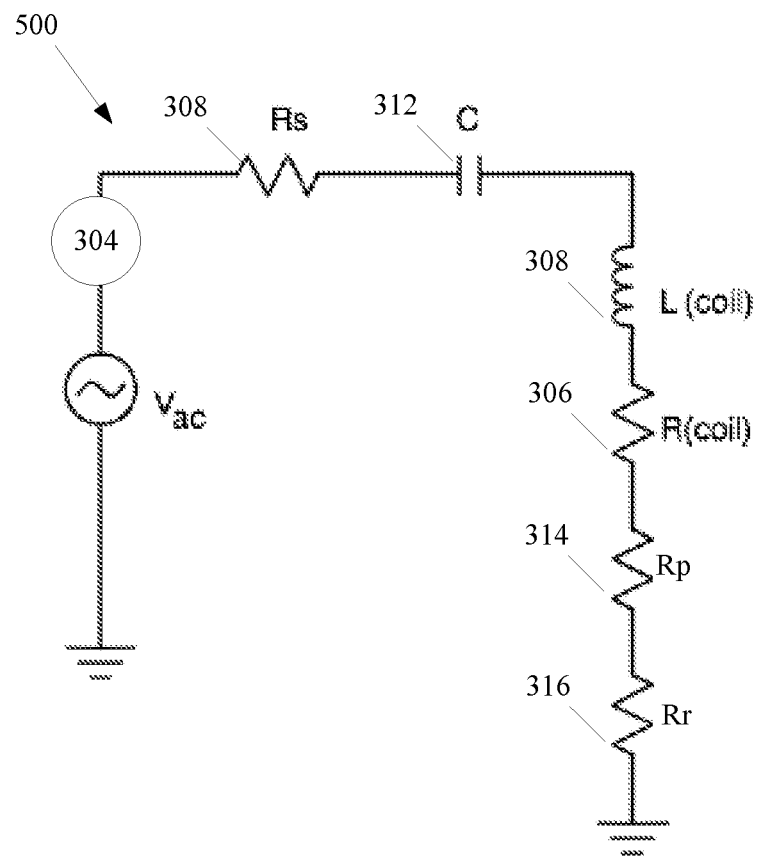
FIG. 5 shows another embodiment of RLC equivalent circuit that models a receiver in proximity to a transmitter in accordance with the described embodiments.

FIG. 5 shows another embodiment of circuit 300 that models a receiver in proximity to transmitter 100 as circuit 500. The receiver load can be modeled as receiver resistance $R_r$ 316 such that at resonance the circuit impedance $Z_{circuit}$ satisfies Eq. (6):

$$Z_{circuit} = R_s + R_{coil} + R_p + R_r \quad \text{Eq. (6)}.$$

Figure 6:
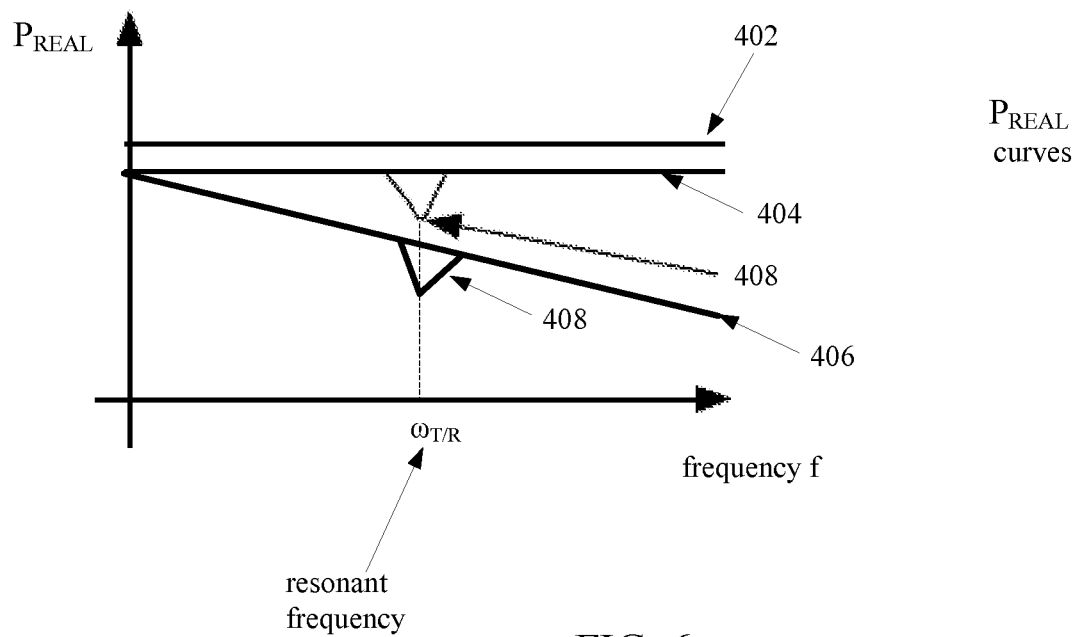
FIG. 6 shows $P_{real}$ curve representing presence or resonating receiver based upon RLC equivalent circuit of FIG. 5.

In this way, the value of $Z_{circuit}$ will increase due to the presence of the resonant receiver causing $P_{Real}$ to drop around where the resonance frequency of transmitter 100 lines up with the resonance frequency of receiver 200 as shown in FIG. 6 indicating the presence of a resonating receiver.

Accordingly, by using both frequency sweeping and maintaining the transmitter equivalent circuit in resonance, a receiver resonance frequency can be automatically determined and the transmitter tuned in accordance with the following procedure. Firstly, transmitter 100 can be configured to include a variable reactance element such as a variable capacitor along the lines of capacitor C 312. Transmitter 100 can be provided power by a variable power supply that can supply a variable frequency voltage V(f) that can be incremented from a low frequency value $f_{LOW}$ to a high frequency value $f_{HIGH}$ during a frequency sweep operation. A power detector coupled in series with the variable frequency voltage supply can be used to detect the circuit real power $P_{Real}$.

During the frequency sweep operation, the power detector provides a periodic value of $P_{Real}$ which is measured against a previous value of $P_{Real}$ in order to determine a value of frequency f corresponding to a pre-determined drop in value of $P_{Real}$ with respect to a previous value of $P_{Real}$. In the described embodiment, the frequency or range of frequencies corresponding to the detected pre-determined drop 408 in value of $P_{Real}$ can be associated with a resonant frequency $\omega_R$ of receiver 200 as that can be used to tune transmitter resonant frequency $\omega_T$. In one embodiment, transmitter resonant frequency $\omega_T$ can be determined using an iterative process in which a range of frequencies corresponding to drop 408 can be used to determine a center frequency corresponding to a desired transmitter resonant frequency $\omega_T$.

Figure 7:
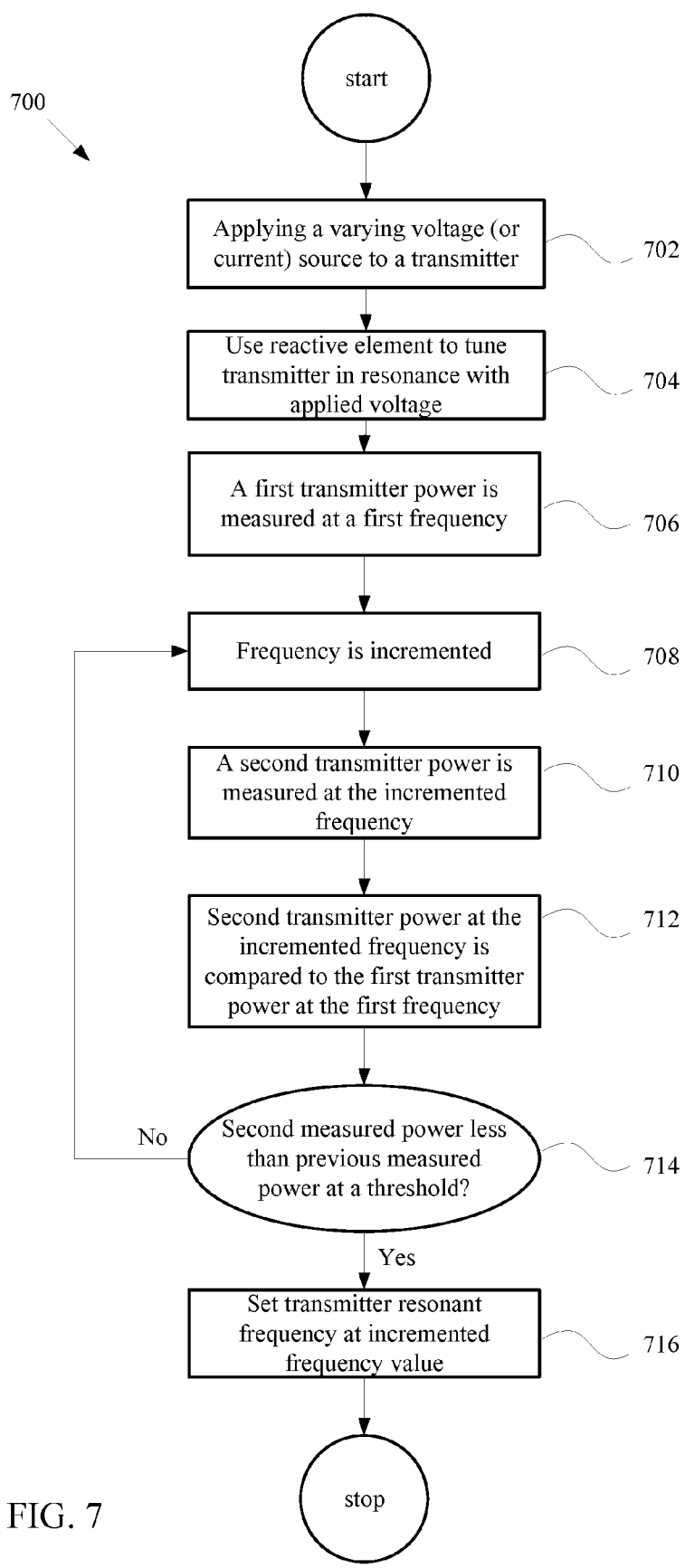
FIG. 7 shows a flow chart detailing a process for automatically tuning a transmitter in a wireless circuit.

FIG. 7 shows a flow chart detailing a process 700 for automatically tuning a transmitter in a wireless circuit. Process 700 can be carried out by applying a varying voltage (or current) source to a transmitter at 702. At 704, a reactive element coupled to the transmitter is used to adjust the transmitter in resonance in accordance with the applied voltage. At 706, a first transmitter real power is measured at a first frequency. At 708, the frequency is incremented and at 710 a second transmitter real power is measured at the incremented frequency. At 712, the second transmitter real power at the incremented frequency is compared to the first transmitter real power at the first frequency. If at 714 the comparison indicates that the second real power is less than the first real power by an amount greater than a pre-determined amount, then the frequency of the voltage source is set to the incremented frequency at 716, otherwise control is passed back to 708. It should be noted that $I_{rms}$ and $V_{rms}$ can also be used to analogize the change in real power as a function of transmitter frequency in accordance with Eq. (4).

Figure 8:
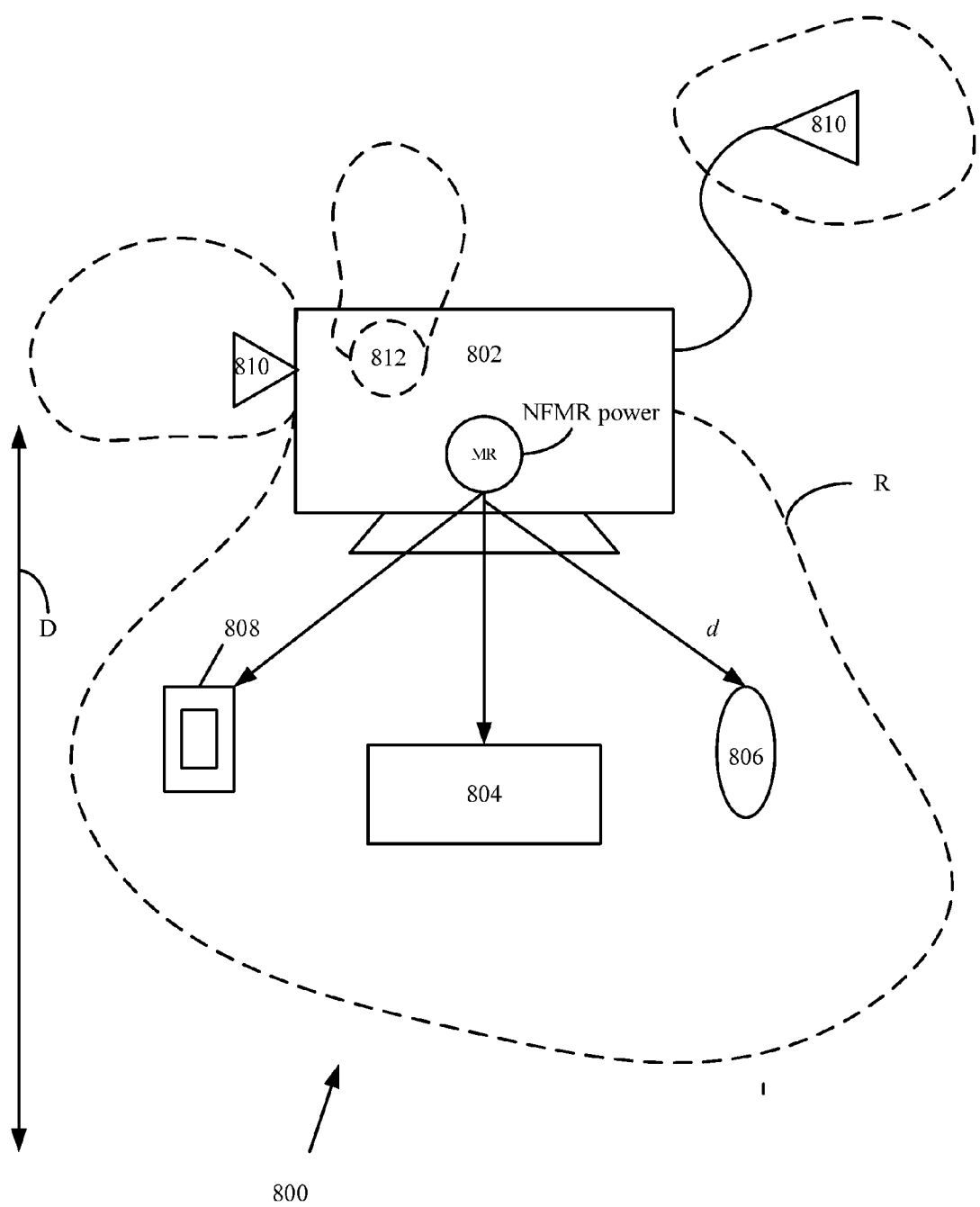
FIG. 8 shows representative virtual charging area in accordance with the described embodiments.

FIG. 8 shows representative virtual charging area 800 in accordance with the described embodiments. Virtual charging area 800 provides region R of charging for suitably configured devices placed within the region R. NFMR power supply can be placed in central unit such as desktop computer. In this way, the desktop computer can provide the NFMR power supply with computing resources. It should be noted that the near field magnetic resonance (NFMR) power supply can include high Q circuit that relies upon near field magnetic coupling by way of a resonance channel formed between resonances of the power source and sink to transfer power. The NFMR power supply can be a standalone unit such as, for example, included in a desk top computer, laptop computer, tablet computer, and so on. In other embodiments, the NFMR power supply can take the form of a portable type unit such as a dongle that can be connected to a legacy device such as a desktop computer thereby providing the ability to retrofit devices. In still other embodiments, housing or a portion of a housing used to enclose the NFMR power source can act to extend a useful range of the NFMR power supply.

As shown in FIG. 8 virtual charging area 800 includes central unit 802 (desktop computer) that can include the NFMR power supply, keyboard 804, mouse 806, and portable media player 808. In one embodiment, keyboard 804 can be configured to receive power directly from the NFMR power supply included in desktop computer 802 as can mouse 806 and portable media player 808 (when located within range R).

In some cases, the ability of desktop computer 802 to provide power directly to mouse 806, for example, can be reduced due to any number of factors. Such factors can include, for example, the addition of other devices into region R that require power from the NFMR power supply, obstacles interfering with the direct power channel formed between the NFMR and mouse 806, and so on. In this case, keyboard 804 can act as a re-resonator such that a portion of the power delivered to keyboard 804 from the NFMR power supply can be passed on by way of a re-resonator transmission unit (not shown) in keyboard 804. In this way, any power loss experienced by mouse 806 can be ameliorated by the power received from keyboard 804. This arrangement can be transitory or can last for as long as mouse 806 is not able to receive adequate power directly from the NFMR power supply. In other cases, the locating of portable media player 808 within region R can reduce the amount of power available to keyboard 804 and mouse 806. In this case, if a battery in keyboard 806 is fully charged (or additional charge is not necessary) then keyboard 806 can decouple a charging circuit while still maintaining a re-resonator circuit providing power to mouse 806.

In some embodiments, dongle 810 can be connected to desktop computer 802 (by way of a USB port or cable, for example). So connected, dongle 810 can, in turn, act as a range extender for the NFMR power supply. In this way, dongle 810 can extend a range that power can be provided by the NFMR power supply included in desktop computer 802. In some cases, dongle 810 can re-resonate power already received from the NFMR power supply while in other cases, dongle 810 can include its own NFMR power supply. By having its own NFMR power supply, dongle 810 can provide additional power wirelessly to those devices within virtual charging region 800 separate from the power provided by the NFMR power supply included in desktop 802. It should be noted that in some embodiments, the housing 812 of desktop computer 802 (or a portion thereof) can be used as a resonator as part of the NFMR power supply.

Figure 9:
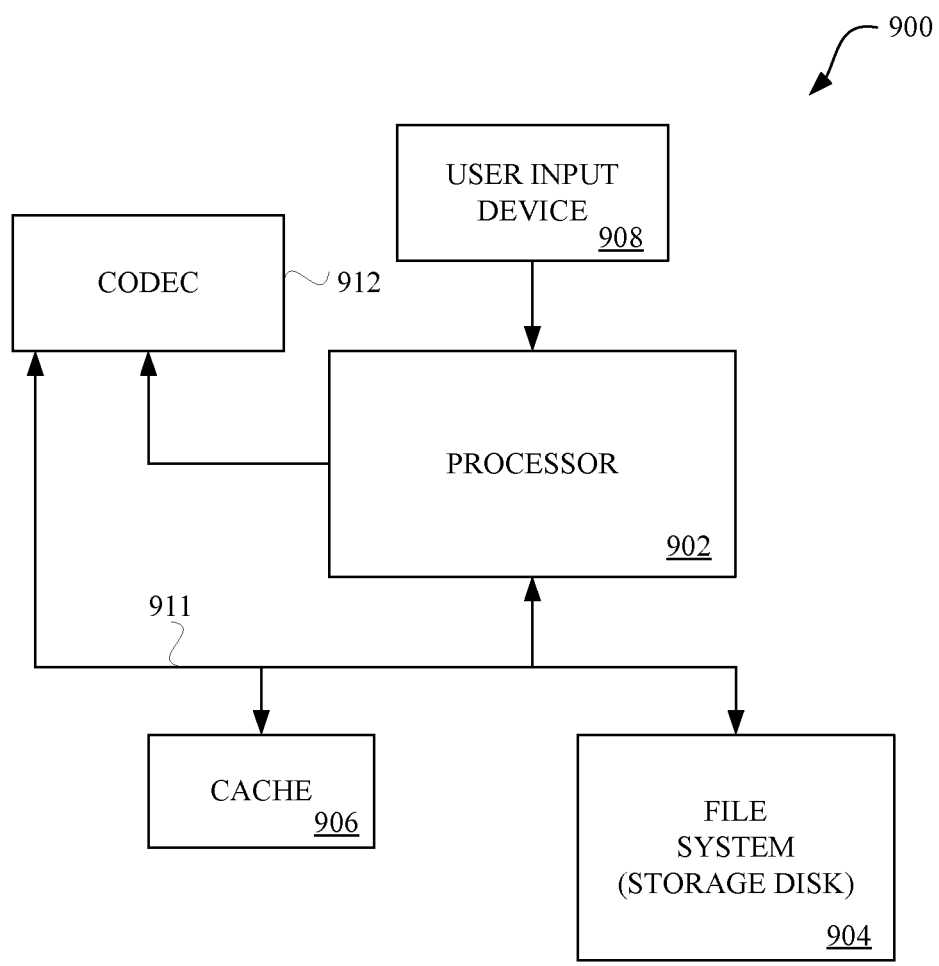
FIG. 9 shows a computing system in accordance with the described embodiments.

FIG. 9 is a block diagram of computing system 900 in accordance with the described embodiments. Computing system 900 includes processor 902 that pertains to a microprocessor or controller for controlling the overall operation of computing system 900. Computing system 900 stores data pertaining to media items, for example, in a file system 904 and a cache 906. The file system 904 is, typically, a storage disk or a plurality of disks. The file system typically provides high capacity storage capability for computing system 900. However, since the access time to the file system 904 is relatively slow, computing system 900 also includes a cache 906. The cache 906 is, for example, Random-Access Memory (RAM) provided by semiconductor memory. The relative access time to the cache 906 is substantially shorter than for the file system 904. However, the cache 906 does not have the large storage capacity of the file system 904.

Further, the file system 904, when active, consumes more power than does the cache 906. The power consumption is particularly important when the computing system 900 is a portable media player that is powered by a battery (not shown).

Computing system 900 also includes a user input device 908 that allows a user of computing system 900 to interact with computing system 900. For example, the user input device 908 can take a variety of forms, such as a button, keypad, dial, etc. Still further, the computing system 900 includes data bus 911 can facilitate data transfer between at least the file system 904, the cache 906, the processor 902, and the CODEC 912.

In one embodiment, computing system 900 serves to store a plurality of media items (e.g., songs) in the file system 904. When a user desires to have the media player play a particular media item, a list of available media items is displayed on the display 911. Then, using the user input device 908, a user can select one of the available media items. The processor 502, upon receiving a selection of a particular media item, supplies the media data (e.g., audio file) for the particular media item to a coder/decoder (CODEC) 912.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the invention. Thus, the foregoing descriptions of specific embodiments are presented for purposes of illustration and description. They are not intended to be exhaustive or to limit the invention to the precise forms disclosed. It will be apparent to one of ordinary skill in the art that many modifications and variations are possible in view of the above teachings.

What is claimed is:

1. A wireless power transmission unit comprising:
a varying frequency excitation source arranged to provide a variable circuit excitation at frequency f; and
a first resonator structure coupled to the varying frequency f power supply, the first resonator structure having a resonant frequency $\omega_1$, a first Q factor $Q_1$, and a characteristic size $L_1$ wherein non-radiative energy transfer between the first resonator structure and at a second resonator structure positioned apart from the transmission unit, the second resonator structure having a resonant frequency $\omega_2$, a second Q factor $Q_2$, and a characteristic size $L_2$ is mediated through a magnetic resonant coupling associated with evanescent tails between the first resonator structure and the second resonator structure when the first resonator structure and the second resonator structure are in a tuned state when the first resonant frequency $\Gamma_1$ and the second resonant frequency $\omega_2$ are within the narrower of first resonance width $\Gamma_1$ or second resonance width $\Gamma_2$ such that the first resonant frequency $\omega_1$ and the resonant frequency $\omega_2$ are separated by a bandwidth of no more than 3db, wherein the first resonator structure maintains the first resonator structure and the second resonator structure in the tuned state by varying the first resonant frequency $\omega_1$ such that the first resonant frequency $\omega_1$ and the resonant frequency $\omega_2$ are separated by the bandwidth of no more than 3db or are within the narrower of first resonance width $\Gamma_1$ or second resonance width $\Gamma_2$ in accordance with any changes in the second resonant frequency $\omega_2$.

2. The wireless power transmission unit as recited in claim 1, wherein the varying frequency excitation source is a varying voltage supply arranged to provide frequency dependent voltage $V_f$.

3. The wireless power transmission unit as recited in claim 2, wherein the first resonator structure comprises:
a transmitter coil coupled to the varying frequency f power supply, wherein in the tuned state, the transmitter coil wirelessly provides real power $P_{real}$ at the first resonant frequency $\omega_1$ to the second resonator structure by magnetic resonant inductive coupling, the transmitter coil having a representative transmitter coil resistance $R_{coil}$.

4. The wireless power transmission unit as recited in claim 3, wherein the transmitter coil further comprises:
a variable impedance element coupled in series with the transmitter coil resistance $R_{coil}$.

5. The wireless power transmission unit as recited in claim 4, further comprising:
an average current ($I_{ave}$) indicator connected in series to the varying voltage supply, the transmitter coil resistance $R_{coil}$ and the variable impedance element, the $I_{ave}$ indicator arranged to provide an indication of an average current $I_{ave}$ in real time in the wireless power transmission unit;
a parasitic resistance $R_p$ connected in series with the variable impedance element and the coil resistance $R_{coil}$; and
a receiver load $R_r$ corresponding to a receiver load representing a load on the wireless power transmission unit caused by the coupling of the first resonator structure and the second resonator structure.

6. The wireless power transmission unit as recited in claim 5, wherein the wireless power transmission unit has an effective circuit impedance $Z_{circuit}$ at resonance in accordance with $Z_{circuit}=R_s+R_{coil}+R_p+R_r$.

7. The wireless power transmission unit as recited in claim 6, further comprising:
a processor coupled with the varying frequency voltage supply and with the average current $I_{ave}$ indicator arranged to calculate a real power ($P_{real}$) value corresponding to an amount of real power $P_{real}$ wirelessly transmitted by the first resonator structure to the second resonator structure in real time in the tuned state.

8. The wireless power transmission unit as recited in claim 7, wherein the processor calculates the amount of real power $P_{real}$ wirelessly transmitted by the first resonator structure to the second resonator structure in accordance with $P_{Real}=(I_{ave})^2 Z_{circuit}$.

9. The wireless power transmission unit as recited in claim 8, wherein the processor automatically determines second resonant frequency $\omega_2$ by:
setting the frequency f of the variable voltage supply to a current frequency $f_{current}$;
performing a frequency sweep by incrementing the current frequency $f_{current}$ in a range of frequencies having a low frequency $f_{low}$ and a high frequency $f_{high}$;
adjusting the variable impedance element to maintain the wireless power transmission unit in resonance at the current frequency $f_{current}$;
instructing the $I_{ave}$ indicator to periodically measure the $I_{ave}$ as a current $I_{ave}$ at the current frequency $f_{current}$;
calculating a current real power $P_{real}$ at the current frequency $f_{current}$;
comparing the current real power $P_{real}$ with a previously calculated real power $P_{real}$;
if the current real power $P_{real}$ is less than the previously calculated real power $P_{real}$ by at least a pre-determined amount, then setting the frequency f of the variable voltage supply to the current frequency $f_{current}$, otherwise,
adjusting the current frequency $f_{current}$ within the range of the low frequency $f_{low}$ to the high frequency $f_{high}$.

10. The wireless power transmission unit as recited in claim 9, comprising:
a variable capacitance element having a variable capacitance value C, the variable capacitance element coupled to the processor, wherein the processor maintains the wireless power transmission unit in resonance during the frequency sweep by adjusting the variable capacitance value C such that the overall impedance of the wireless power transmission unit is essentially zero.

11. The wireless power transmission unit as recited in claim 9, comprising:
a variable inductance element having a variable inductance value L, the variable inductance element coupled to the processor, wherein the processor maintains the wireless power transmission unit in resonance during the frequency sweep by adjusting the variable inductance value L such that the overall impedance of the wireless power transmission unit is essentially zero.

12. A wirelessly powered local computing environment, comprising:
a variable frequency power supply arranged to provide power at a frequency;
an resonance frequency adjustable near field magnetic resonance (NFMR) wireless transmitter coupled to the power supply and arranged to create a resonance channel used to transfer useable energy from the power supply to a receiver within a near field distance d; and
a central processing unit, the central processing unit providing processing resources to the variable frequency power supply and the resonance frequency adjustable NFMR transmitter, wherein when the NFMR transmitter establishes a resonance coupling with the receiver, the central processing unit maintains at least a minimum system Q factor $Q_{system}$ by adjusting only the resonance frequency of the NFMR transmitter.

13. The wirelessly powered local computing environment as recited in claim 12, further comprising:
a power detector connected in series with the variable frequency power supply arranged to monitor a current in the NFMR wireless transmitter and provide a corresponding current value.

14. The wirelessly powered local computing environment claim 13, wherein during a frequency sweep operation, the central processing unit adjusts the frequency of the variable frequency power supply from a low frequency value to a high frequency value and instructs the power detector to concurrently monitor the power in the NFMR transmitter.

15. The wirelessly powered local computing environment as recited in claim 14, further comprising:
an adjustable reactive element connected in series with variable frequency power supply forming an RLC equivalent circuit corresponding to the NFMR transmitter, wherein during the frequency sweep operation the central processing unit adjusts the adjustable reactive element in order to maintain the NFMR transmitter in resonance.

16. The wirelessly powered local computing environment as recited in claim 15, wherein the adjustable reactive element is an adjustable capacitor having an adjustable capacitance C or an adjustable inductor having an adjustable inductance L.

17. The wirelessly powered local computing environment as recited in claim 16, wherein when the monitored power in the NFMR transmitter at a current frequency is less than an average power value by a pre-determined amount, then the frequency of the adjustable power supply is set to the current frequency.

18. A method performed by a wireless power transmission unit for automatically tuning a wireless power transmission system, comprising:
the wireless power transmission unit including at least a first resonator structure coupled to a varying frequency f voltage supply,
in a tuned state, establishing a magnetic resonant inductive coupling between the first resonator structure to a second resonator structure positioned apart from the wireless power transmission unit;
non-radiatively transferring useable power from the first resonator structure to the second resonator structure using the magnetic resonant inductive coupling between the first resonator structure and the second resonator structure, wherein in the tuned state, a first resonant frequency $\omega_1$ of the first resonator structure and a second resonant frequency $\omega_2$ of the second resonator structure are separated by a bandwidth of no more than 3db;
wherein the first resonator structure maintains the first resonator structure and the second resonator structure in the tuned state by varying a first resonant frequency $\omega_1$ of the first resonant structure in order to maintain the separation of the first resonant frequency $\omega_1$ and the second resonant frequency $\omega_2$ of no more than 3db in accordance with any change in the second resonant frequency $\omega_2$.

19. The method as recited in claim 18, wherein the varying frequency excitation source is a varying voltage supply arranged to provide frequency dependent voltage $V_f$.

20. The method as recited in claim 19, wherein the first resonator structure comprises:
a transmitter coil coupled to the varying frequency f power supply, wherein in the tuned state, the transmitter coil wirelessly provides real power $P_{real}$ at the first resonant frequency $\omega_1$ to the second resonator structure by magnetic resonant inductive coupling, the transmitter coil having a representative transmitter coil resistance $R_{coil}$.

21. The method as recited in claim 20, the transmitter coil further comprising:
a variable impedance element coupled in series with the transmitter coil resistance $R_{coil}$.

22. The method as recited in claim 21, the wireless power transmission unit further comprising:
an average current ($I_{ave}$) indicator connected in series to the varying voltage supply, the transmitter coil resistance $R_{coil}$ and the variable impedance element, the $I_{ave}$ indicator arranged to provide an indication of an average current $I_{ave}$ in real time in the wireless power transmission unit;
a parasitic resistance $R_p$ connected in series with the variable impedance element and the coil resistance $R_{coil}$; and
a receiver load $R_r$ corresponding to a receiver load representing a load on the wireless power transmission unit caused by the coupling of the first resonator structure and the second resonator structure.

23. The method as recited in claim 22, wherein the wireless power transmission unit has an effective circuit impedance $Z_{circuit}$ at resonance in accordance with $Z_{circuit}=R_s+R_{coil}+R_p+R_r$.

24. The method as recited in claim 23, wherein the wireless power transmission unit further comprises:
a processor coupled with the varying frequency voltage supply and with the average current $I_{ave}$ indicator arranged to calculate a real power ($P_{real}$) value corresponding to an amount of real power $P_{real}$ wirelessly transmitted by the first resonator structure to the second resonator structure in real time in the tuned state.

25. The method as recited in claim 24, wherein the processor calculates the amount of real power $P_{real}$ wirelessly transmitted by the first resonator structure to the second resonator structure in accordance with $P_{Real}=(I_{ave})^2 Z_{circuit}$.

26. The method as recited in claim 25, wherein the processor automatically determines the second resonant frequency $\omega_2$ by:

setting the frequency f of the variable voltage supply to a current frequency $f_{current}$;

performing a frequency sweep by incrementing the current frequency $f_{current}$ in a range of frequencies having a low frequency $f_{low}$ and a high frequency $f_{high}$;

adjusting the variable impedance element to maintain the wireless power transmission unit in resonance at the current frequency $f_{current}$;

instructing the $I_{ave}$ indicator to periodically measure the $I_{ave}$ as a current $I_{ave}$ at the current frequency $f_{current}$;

calculating a current real power $P_{real}$ at the current frequency $f_{current}$;

comparing the current real power $P_{real}$ with a previously calculated real power $P_{real}$; if the current real power $P_{real}$ is less than the previously calculated real power $P_{real}$ by at least a pre-determined amount, then setting the frequency f of the variable voltage supply to the current frequency $f_{current}$, otherwise, adjusting the current frequency $f_{current}$ within the range of the low frequency $f_{low}$ to the high frequency $f_{high}$.

27. The method as recited in claim 26, wherein the wireless power transmission unit further comprises:

a variable capacitance element having a variable capacitance value C, the variable capacitance element coupled to the processor, wherein the processor maintains the wireless power transmission unit in resonance during the frequency sweep by adjusting the variable capacitance value C such that the overall impedance of the wireless power transmission unit is essentially zero.

28. The method as recited in claim 26, wherein the wireless power transmission unit further comprises:

a variable inductance element having a variable inductance value L, the variable inductance element coupled to the processor, wherein the processor maintains the wireless power transmission unit in resonance during the frequency sweep by adjusting the variable inductance value L such that the overall impedance of the wireless power transmission unit is essentially zero.

* * * * *

UNITED STATES PATENT AND TRADEMARK OFFICE
CERTIFICATE OF CORRECTION

PATENT NO.       : 8,796,886 B2
APPLICATION NO.  : 13/452726
DATED            : August 5, 2014
INVENTOR(S)      : Li-Quan Tan et al.

It is certified that error appears in the above-identified patent and that said Letters Patent is hereby corrected as shown below:

In the Claims:

Column 11, line 43 (Claim 1, line 17): "frequency $\Gamma_1$" should read --frequency $\omega_1$--.

Column 12, line 43 (Claim 9, line 7): "$f_{current}$in" should read --$f_{current}$ in--.

Signed and Sealed this
Seventh Day of October, 2014

Michelle K. Lee
*Deputy Director of the United States Patent and Trademark Office*